US011743352B1

(12) United States Patent
Thomas et al.

(10) Patent No.: US 11,743,352 B1
(45) Date of Patent: Aug. 29, 2023

(54) MOBILE NETWORK SWITCHING

(71) Applicant: International Business Machines Corporation, Armonk, NY (US)

(72) Inventors: Mathews Thomas, Flower Mound, TX (US); Sai Srinivas Gorti, Coppell, TX (US); Sharath Prasad Krishna Prasad, Flower Mound, TX (US); Amandeep Singh, Carrollton, TX (US); Praveen Jayachandran, Bangalore (IN); Dushyant K. Behl, Bangalore (IN); Mudit Verma, New Delhi (IN); Utpal Mangla, Toronto (CA); Steven Layne Canepa, Woodland Hills, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/804,156

(22) Filed: May 26, 2022

(51) Int. Cl.
| | | |
|---|---|---|
| *H04L 29/08* | (2006.01) | |
| *H04L 67/30* | (2022.01) | |
| *H04L 67/51* | (2022.01) | |
| *H04W 8/20* | (2009.01) | |
| *H04W 12/72* | (2021.01) | |
| *H04W 12/082* | (2021.01) | |
| *H04W 28/02* | (2009.01) | |
| *H04W 76/11* | (2018.01) | |

(52) U.S. Cl.
CPC ............. *H04L 67/51* (2022.05); *H04W 8/20* (2013.01)

(58) Field of Classification Search
CPC ......... H04L 67/51; H04L 15/16; H04L 29/06; H04W 8/20; H04W 12/08; G06F 15/16

USPC .......................................................... 709/223
See application file for complete search history.

(56) References Cited

U.S. PATENT DOCUMENTS

| | | | |
|---|---|---|---|
| 5,862,490 A | 1/1999 | Sasuta et al. | |
| 7,526,270 B2 | 4/2009 | Benco et al. | |
| 8,275,852 B2 * | 9/2012 | Uchida | ................... G06F 16/93 709/219 |

(Continued)

FOREIGN PATENT DOCUMENTS

| | | |
|---|---|---|
| CN | 105530020 B | 6/2018 |
| CN | 105682077 B | 8/2019 |

(Continued)

OTHER PUBLICATIONS

"Local Call Local Switching," https://www.etsi.org/deliver/etsi_ts/123200_123299/123284/10.01.00_60/ts_123284v100100p.pdf, ETSI TS 123 284 v10.1.0 (Jun. 2011), Technical Specification, 178 pgs.

(Continued)

*Primary Examiner* — Jude Jean Gilles
(74) *Attorney, Agent, or Firm* — Robert J. Shatto

(57) ABSTRACT

Provided is a method for selecting a service provider for an application. The method includes detecting a plurality of available service providers for an application running on a computing device. The method further includes comparing service information for each of the plurality of service providers to a set of service provider selection factors for the application. The method further includes selecting a first service provider of the plurality of service providers to provide service for the application.

22 Claims, 7 Drawing Sheets

(56) References Cited

U.S. PATENT DOCUMENTS

| | | | |
|---|---|---|---|
| 8,780,895 B1* | 7/2014 | McLaughlin | H04M 3/5116 370/352 |
| 8,811,969 B2 | 8/2014 | Shi et al. | |
| 9,191,420 B2 | 11/2015 | Christie, IV | |
| 9,380,454 B2 | 6/2016 | Kukuchka et al. | |
| 2003/0003933 A1 | 1/2003 | Deshpande et al. | |
| 2006/0047761 A1* | 3/2006 | Kaplan | H04L 67/51 709/206 |
| 2008/0113661 A1* | 5/2008 | Repka | H04W 48/18 455/418 |
| 2012/0311647 A1* | 12/2012 | Sharma | H04L 65/611 725/94 |
| 2015/0271773 A1* | 9/2015 | Mahdi | H04L 65/1066 370/328 |
| 2018/0262405 A1* | 9/2018 | Papageorgiou | H04L 41/5025 |
| 2018/0310238 A1* | 10/2018 | Opsenica | H04W 12/06 |
| 2019/0182875 A1* | 6/2019 | Talebi Fard | H04W 8/18 |
| 2020/0169921 A1* | 5/2020 | Zhu | H04W 8/02 |
| 2020/0359218 A1* | 11/2020 | Lee | H04L 63/0838 |
| 2021/0067489 A1* | 3/2021 | Jayawardena | H04L 63/1425 |
| 2021/0216992 A1* | 7/2021 | Jang | G06Q 20/325 |
| 2021/0258808 A1* | 8/2021 | Mahimkar | H04W 24/08 |

FOREIGN PATENT DOCUMENTS

| | | |
|---|---|---|
| GB | 2381418 B | 4/2004 |
| WO | 200940761 A2 | 4/2009 |
| WO | 202046348 A1 | 3/2020 |

OTHER PUBLICATIONS

"MyNetworkQuality android application," https://play.google.com/store/apps/details?id=com.tricktekno.animatedsplash, printed Mar. 22, 2022, 1 pg.

"Telecom—OTT Partnership—Generating New Revenue Sharing Models," https://sidtm.edu.in/wp-content/uploads/2020/04/TBR-2016.pdf#page=27, Telecom Business Review, vol. 9, Issue 1, Sep. 2016, ISSN: 0973-9114, 55 pgs.

Mell et al., "The NIST Definition of Cloud Computing," Recommendations of the National Institute of Standards and Technology, U.S. Department of Commerce, Special Publication 800-145, Sep. 2011, 7 pgs.

Rao et al., "Multiple Network Operator Services Utilization Using Single SIM Card," http://ijcte.org/papers/339-G465.pdfm, International Journal of Computer Theory and Engineering, vol. 3, No. 3, Jun. 2011, 5 pgs.

\* cited by examiner

MOBILE NETWORK SWITCHING

BACKGROUND

The present disclosure relates generally to the field of computing systems, and more particularly to selecting service provider networks based on application requirements.

A cellular network or mobile network is a communication network where the link to and from end nodes is wireless. The network is distributed over land areas called "cells," each served by at least one fixed-location transceiver (typically three cell sites or base transceiver stations). These base stations provide the cell with the network coverage which can be used for transmission of voice, data, and other types of content. A mobile device connects to a cellular network to provide voice, data, and other services to all of the application on the mobile device.

SUMMARY

Embodiments of the present disclosure include a method, computer program product, and system for selecting a service provider for an application. The method includes detecting a plurality of available service providers for an application running on a computing device. The method further includes comparing service information for each of the plurality of service providers to a set of service provider selection factors for the application. The method further includes selecting, based on the comparing, a first service provider of the plurality of service providers to provide service for the application.

Unlike current techniques, where every application on a user's device uses the same service provider, and the service provider is selected based on a contract the user has with a specific service provider, the above described embodiments allow the applications to select their service provider based on their particular needs. This allows application providers to ensure high quality service to end users by selecting a service provider that is better tailored to the requirements of the application.

In an optional embodiment, the method includes detecting a change in the service information for at least one service provider of the plurality of service providers, comparing new service information for the at least one service provider to the set of service provider selection factors for the application, and switching to a second service provider of the plurality of service providers. Advantageously, switching service providers in response to detecting a change in the service information, which can negatively impact performance of the application and can be detected before the change has actually been implemented, enables an application to always use the best service provider for it. This can limit downtime or poor performance of the application, particularly when the application switches service providers before the negative change has even occurred.

In an optional embodiment, the method includes detecting a change in a type of activity being performed by the application, determining, using the set of service provider selection factors for the application, that a second service provider of the plurality of service providers should be used to provide service to the application, and switching to the second service provider. As discussed above, switching service providers when a different service provider is better suited to the needs of the application improves application performance and the user's experience using the application. Furthermore, by switching based on changes to the application itself, the application is able to react not only to changes in the service provider, but also in changes to what the user is doing with the application. For example, in some embodiments, the application can proactively switch to a more secure service provider in response to a user attempting to access confidential or personal data, thereby reducing security concerns.

In an optional embodiments, the computing device further includes a second application running thereon. The second application receives service from a second service provider that is different than the first service provider. The computing device is concurrently connected to both the first and second service providers, and the first and second service providers provide service to the first and second applications, respectively, at the same time. Allowing different applications to connect to different service provider networks advantageously enables each application to select the service provider that is best suited to its use, ensuring that each application operates at a high performance and provides a good experience to the end user. This is in contrast to current technologies, where the user is stuck with a single service provider that may be good at providing services to one application, but bad at providing a different type of service to a different application.

In an optional embodiment, selecting the first service provider comprises scoring each of the plurality of service providers based on the set of service provider selection factors, ranking each of the plurality of service providers based on the scoring, and determining that the first service provider is the highest ranked service provider. By scoring and ranking the service providers according to a set of factors, the application is able to select a service provider that will enable the application to perform well.

In an optional embodiment, the method includes, in response to determining that the first service provider is providing inadequate service to the application, creating a new slice for the application and connecting the application to the first service provider using the new slice. This embodiments advantageously takes advantage of 5G network's ability to create network slices, which can improve performance of the application.

Further embodiments of the present disclosure include a method, computer program product, and system for selecting a service provider for an application. The method includes executing a plurality of applications on a mobile device. The mobile device has one or more virtual SIM cards. The method further includes determining that a first application of the plurality of applications should receive service from a first service provider. The method further includes determining that a second application of the plurality of applications should receive service from a second service provider. The method further includes connecting, using the one or more virtual SIM cards, the mobile device to the first and second service providers such that the first service provider provides mobile data service to the first application and the second service provider provides mobile data service to the second application concurrently.

Unlike current techniques, where every application on a user's device uses the same service provider, and the service provider is selected based on a contract the user has with a specific service provider, the above described embodiments allow the applications to select their service provider based on their particular needs. This allows application providers to ensure high quality service to end users by selecting a service provider that is better tailored to the requirements of the application.

Furthermore, these embodiments advantageously leverage virtual SIM technologies to enable different applications on the same mobile device to use different service providers concurrently. Allowing different applications to connect to different service provider networks advantageously enables each application to select the service provider that is best suited to its use, ensuring that each application operates at a high performance and provides a good experience to the end user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
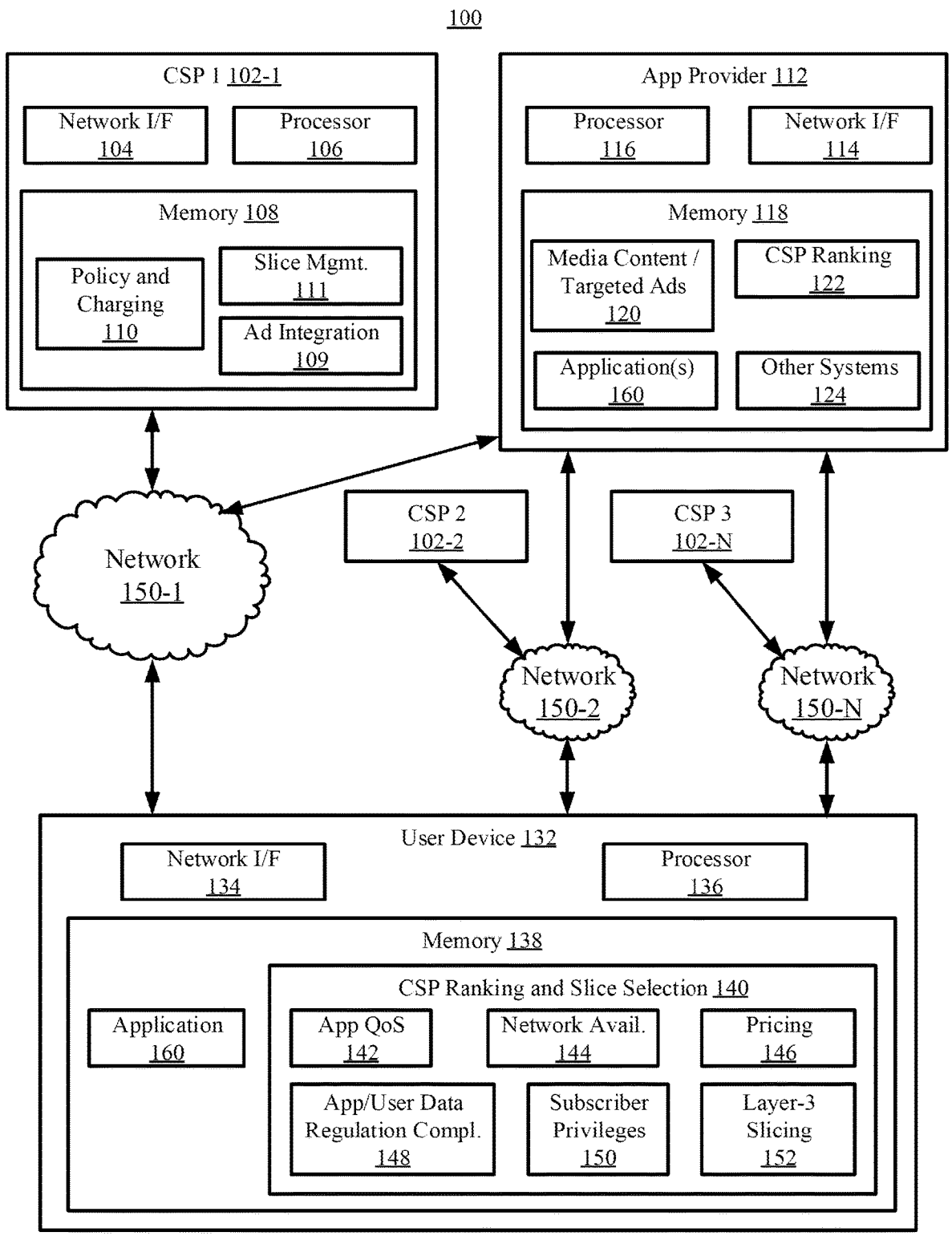
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computing systems, and more particularly to selecting service provider networks based on application requirements. While the present disclosure is not necessarily limited to such applications, various aspects of the disclosure may be appreciated through a discussion of various examples using this context.

Users may currently not use an application on a mobile or other device for a variety of reasons, including limited service availability, insufficient data plan, or poor experience due to network issues when using the application. For example, users may avoid watching movies or television on their phones, even when they otherwise would like to, due to network issues that make the viewing experience unenjoyable. This means that the creators of these applications are not able to fully monetize their application for reasons beyond their control.

Virtual subscriber identification module (SIM) cards are slowly emerging and will soon replace physical SIM cards. SIM cards, including virtual SIM cards, are intended to securely store the international mobile subscriber identity (IMSI) number and its related key, which are used to identify and authenticate subscribers on mobile telephony devices. The early virtual SIM cards will be limited to a single service provider or will permit the user to switch between providers.

Embodiments of the present disclosure take advantage of the current and future capabilities of virtual SIM cards to provide opportunities for application providers to improve their customer experience by better addressing the underlying network issues. In particular, in some embodiments, application providers can improve customer experience by integrating virtual SIM card functionality more effectively into their applications. These applications could be those provided by third party providers or by the device creator (e.g., backup of device). Specifically, the application provider can create rules that dictate which service provider(s) their applications use, irrespective of what contracts the end user has. This can be done by having the application provider enter into direct arrangements with the service providers themselves, instead of or in addition to any agreements that the end user has with a service provider. The applications will then be governed by the rules set out by the application provider. This enables the application providers the ability to provide a framework to offer new services to their customers and also permit them to reduce their dependencies on the service provider.

The rules set up by the service providers can implement various provisions of the virtual SIM cards and/or 5G functionality. This may be done through the use of application programming interfaces (APIs). For example, the application providers can take advantage of the concurrent use of multiple service providers by a mobile device. An application provider can set up its applications to run on a particular service provider that has suitable speeds, functionalities, service levels, etc., for the particular application(s), even if the user does not have a service agreement with that particular service provider. Having one or more applications use a specific service provider that is different from the service provider used by the mobile device generally spreads the network utilization of the mobile device across multiple service providers, which can increase throughput and ensure that the applications run at higher performance levels.

Because the application provider is arranging for the use of specific service providers instead of relying on the end user's service provider, the application provider has significant flexibility to provide unique services that would not be possible if the application provider was locked into the end user's service provider selection. Some of the unique services that the application provider can provide include:

In some embodiments, the application provider can offer the user free service (e.g., no data usage) when using the application. The application provider can have an agreement with a particular service provider so that the customer will not be charged for the service, and the application will change the service to that particular service provider, even if the user primarily uses a different service provider. The application provider can recover costs by, for example, showing ads, obtaining user data, etc.

In some embodiments, the application provider can have a relationship with multiple service providers. The application can therefore check to determine which service provider is providing the best service for a given use based on user location, current traffic, and the type of use. The applications can then automatically select the service provider that provides the best service for that use.

In some embodiments, the application can change the service provider that it is using in the middle of a transaction (e.g., an instance of an end user using the application) to ensure that the user has a quality experience. In some embodiments, the application may use the service provided that is expected to provide the best quality of service (QoS) for the user instead of the service provider the application provider has pre-selected. In some embodiments, the application may select a service provider based on a financial incentive for the application (e.g., the cheaper service provider and/or the service provider that allows advertisements in place of direct payment).

In some embodiments, the application can use multiple service providers at the same time. For example, assume that an application is providing both video and textual information to a user. If one service provider is optimized for video transmission while another is optimized for data, the application can be configured to use both service providers simultaneously. In other words, the application may be configured to use the service provider optimized for video to provide the video to the user, and the application may simultaneously use the service provider that is optimized for data to provide the textual information to the user.

In some embodiments, the application provider (e.g., through rules in the applications and/or by a server of the application provider) can analyze the end-to-end flow of the transaction to determine which service provider should be used. For example, if the user is connecting to a given web site which is on a given service provider's network, the app may choose that network to improve end-to-end throughput.

In some embodiments, the application can determine which service provider to use based on the security of the service provider. The application may not connect to an unsecure service provider's network at all, and/or it may support greater privileges and authorization when connected to a more secure service provider or private enterprise 5G network. In some embodiments, the application can automatically switch to the more secure network when it is available or when the user wishes to access the more privileged capabilities in the application. Other applications provided by the same or other application providers may continue to use the less secure (e.g., public 5G) network at the same time. The same application can support both a less secure home profile accessible over a public 5G network and a more secure work profile accessible over a private 5G network. By extension, the application can support multiple profiles based on the nature and characteristics of the network it is connected to.

In some embodiments, the application can select a service provider that provides end-to-end data/security compliance for mandatory regulations like GDPR when necessary. For example, the application may select a service provider that supports end-to-end encryption and privacy compliance, does not track it's users, and/or does not route the traffic outside the allowed regulation zone.

In some embodiments, the application may create a network slice for a given service provider or across multiple service providers to enhance the service provided.

In some embodiments, the application may also avoid certain networks at certain times and locations because of agreements with the service provider.

In some embodiments, the benefit provided to the subscriber could be proportional to the benefit the application provider gets. For example, if the subscriber consumes a lot of bandwidth, the frequency of the ads deployed on the application can increase or the application can change so that larger ads can be included. Subscribers may be individuals, and/or they may belong to a group or to multiple groups. The network characteristics of that group can be inherited by the subscriber.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the Figures, FIG. 1 illustrates a block diagram of an example computing environment 100 in which illustrative embodiments of the present disclosure may be implemented. In some embodiments, the computing environment 100 may include a plurality of communication service providers (CSPs), including CSP 1 102-1, CSP 2 102-2, and CSP 3 102-N (collectively and individually referred to as CSP(s) 102), an application provider 112 (e.g., a server operated by the application provider), and a user device 132. The CSPs 102 provide service (e.g., mobile telephone and data service) to subscribers (also referred to herein as end users) via their user devices 132. The application provider 112 is a computer system for an application provider that owns, develops, manages, and/or provides applications to the subscribers. For example, the application provider may create one or more applications (e.g., a video streaming application) that a user can download from an app store. In some embodiments, the application provider can provide services to the subscriber using the application provider 112. For example, the application provider 112 may manage advertisements 120 that can be provided to the subscriber via the user device 132 in exchange for the subscriber using an application developed by the application provider.

Consistent with various embodiments, the CSPs 102, application provider 112, and user device 132 may be computer systems. The CSPs 102, application provider 112, and user device 132 may include one or more processors 106, 116, and 136 and one or more memories 108, 118, and 138, respectively. The CSPs 102, application provider 112, and user device 132 may be configured to communicate with each other through an internal or external network interface 104, 114, and 134. The network interfaces 104, 114, and 134 may be, for example, modems or network interface cards. The CSPs 102, application provider 112, and/or user device 132 may be equipped with a display or monitor. Additionally, the CSPs 102, application provider 112, and/or user device 132 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the CSPs 102, application provider 112, and user device 132 may be servers, desktops, laptops, or mobile devices, such as smart phones or tablets, configured to connect to a mobile telecommunications network (e.g., a 5G network).

The CSPs 102, application provider 112, and user device 132 may be distant from each other and communicate over a network. In some embodiments, the CSPs 102 may be telecommunication service providers that provide networks 150-1, 150-2, 150-N (collectively and individually referred to as network(s) 150) over which the user device 132 accesses the application provider 112. For example, each CSP 102 may create its own network 150, and the application provider 112 and the user device 132 may be configured to connect to one or more of the CSP networks 150 in order to receive and/or transmit data.

In some embodiments, the network 150 can be implemented using any number of any suitable communications media. For example, the network 150 may be or include a wide area network (WAN), a local area network (LAN), a telecommunications network, an internet, or an intranet. In some embodiments, the networks 150 can be any suitable mobile network, including, without limitation, a 3G, 4G, 4G LTE, or 5G mobile network.

In some embodiments, the networks 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the CSP 102 can provide multiple services to the subscriber in addition to basic mobile data connectivity services generally provided by a CSP 102 (e.g., a telecommunications company). These additional services can be provided using one or more modules operating on the CSP 102 hardware. For example, the CSP 102 may include a policy and charging module 110. The policy and charging module 110 may include a policy (e.g., a set of rules) pertaining to the subscriber and how to charge the subscriber for the use of particular applications. These rules may be dictated by a service agreement between the subscriber and the CSP 102, a service agreement between the CSP 102 and the application provider 112, or both. For example, the policy and charging module 110 may be configured to charge an application provider 112, instead of the subscriber, for service provided to the subscriber in relation to an application developed by the application provider 112.

In some embodiments, the CSP 102 includes a slice management module 111. The slice management module 111 may leverage 5G network slicing functionality to create and manage one or more slices relevant to the application(s) being used by the subscriber. 5G network slicing is a network architecture that enables the multiplexing of virtualized and independent logical networks on the same physical network infrastructure. Each network slice is an isolated end-to-end network tailored to fulfil diverse requirements requested by a particular application. Using the one or more network slices, the CSP 102 can provide different data to the subscriber with different levels of service. For example, if the subscriber is watching video on a video streaming application, the CSP 102 can create a network slice to provide high service video data to the subscriber, whereas other data used by the application can be provided using a different slice with lesser service level (e.g., slower service, higher lag time, less reliability), either by the same CSP 102 or by a different CSP 102.

In some embodiments, the CSP 102 includes an ad integration module 109. The ad integration module 109 processes incoming targeted advertisements mapped to user profiles and charging policies. The ad integration module 109 then assigns a targeted advertisement to be part of a subscriber's session streams. For example, a video streaming application may be configured to show ads to a subscriber based on the video being streamed (e.g., ads that people who watch that video often click on) and/or previous searches by the subscriber. In return for watching these ads, the subscriber is not charged for data related to watching the video. If the subscriber is watching a video on how to train a dog, the ad integration module 109 may identify an ad for dog collars or leashes as being relevant, and it may push the ad to the subscriber.

The end user's device 132 may be a smartphone or tablet that supports virtual SIM cards. Using APIs, the virtual SIM card for the user device 132 can facilitate an application switching between, or concurrently using, multiple CSPs 102. Embodiments of the present disclosure integrate these features into applications 160 to provide improved customer experience. In particular, tach end user may have multiple applications 160 running on his/her user device 132. Each application can be equipped to use different CSPs 102 based on various factors of the application itself, the CSPs 102, the user device 132, and/or user preferences.

For example, the user device 132 may include a CSP ranking and slice selection module 140 that is configured to detect/determine various information about the user device 132 and/or application and select a CSP 102 and/or slice to use. The CSP ranking and slice selection module 140 may consider, without limitation, one or more of the following when ranking or selecting a CSP 102:

App QoS 142: Each application may be equipped with QoS factor which determines customer experience and can quickly adapt to the situation when the QoS factor is not satisfactory. The application can find out the problem behind the QoS and can perform certain operations to improve customer experience like changing network to offer better service or offer a paid plan.

Network availability 144: When the user moves to a different location, both the CSP 102 and the application provider 112 can identify the network availability and services that the CSP 102 can offer to the user at the new location. Based on this information, the application can switch CSPs 102 or go to a different plan with the same CSP 102 to ensure that the application functions without any inconsistencies. For example, the application can be configured to automatically switch to a second CSP when the second CSP provides better speeds (and/or lower costs) at the new location.

Pricing 146: The application can select a CSP 102 based on the price being charged by the CSP 102 for the particular service the CSP 102 is providing.

Regulatory Compliance 148: The application can determine a regulatory (e.g., corporate, governmental, etc.) compliance requirement based on, for example, characteristics of the information being accessed. The application can then determine which CSP(s) 102 satisfy the regulatory compliance requirement, and then select the CSP 102 from the acceptable CSPs 102. For example, if the application determines that the data being requested is subject to a government requirement for end-to-end encryption, the application will identify which CSPs 102 permit end-to-end encryption, and it will then connect to a compliant CSP 102 before retrieving the data.

Subscriber privileges 150: The application can modify privilege levels for the user/subscriber based on the nature and characteristics of the network provided by the CSPs 102.

The application can also move to different networks/CSPs 102 based on the privileges desired by the user and the capabilities (e.g., security) offered by the CSPs 102. For example, if a user attempts to open, download, or transmit a confidential document, the application can detect available CSPs 102 (or networks, if a single CSP offers multiple networks in the same location), determine which CSP(s) 102 provide a suitable level of security for the confidential document, and then automatically select a CSP 102 that has the suitable level of security.

Layer-3 Slicing 152: When the application recognizes that the subscriber is not getting good performance with the current service provider, it can identify alternatives and communicate with the CSPs 102 via APIs. And if there are no CSPs 102 that can provide better service than the current CSP(s), the application may recommend a new slice be created for that subscriber. The CSP(s) 102 will then create a new slice so that the performance of the application is improved.

In some embodiments, the application may consider multiple of the above factors when selecting a CSP 102. Furthermore, the individual factors may be weighted according to their level of importance. Additionally, one or more of the factors may be considered mandatory. For example, regulatory compliance 148 may be considered a mandatory factor such that the application will not connect to a non-compliant CSP 102. On the other hand, pricing 146 and QoS 142 may be non-mandatory factors. Still, the non-mandatory factors can be weighted when selecting between candidate CSPs 102 (e.g., CSPs that satisfy all of the mandatory factors) such that for some applications/subscribers, a relatively expensive CSP 102 with a strong QoS 142 score may be selected over a cheaper CSP 102 with a worse QoS 142 score, but for other applications/subscribers, the cheaper CSP 102 is selected. In this example, both the expensive and cheaper CSP 102 will meet the regulatory compliance 148 requirements.

The application provider 112 may be configured to maintain and provide one or more applications 160 to a user. The application provider 112 may provide the one or more applications 160 using, for example, one or more server computers to which subscribers can connect in order to download the one or more applications 160. In some embodiments, the one or more applications 160 may include web applications that the subscriber connects to via, for example, a web browser on the user device 132.

In order to provide features and functionality described herein, the application provider 112 may utilize one or more modules. The one or more modules may be stored in a memory 118 of the application provider's 112 computer/server. In some embodiments, the one or more modules may be downloaded onto the user device 132 for execution by the user device 132. This may be particularly advantageous in situations where the user device 132 is unable to connect to the application provider's 112 servers. In accordance with some embodiments, the application provider 112 may include one or more of the following modules:

CSP Ranking 122: The CSP ranking module 122 is configured to rank the CSPs 102 that are available to the applications 160 provided by the application provider 112. The CSP ranking module 122 may be similar to the CSP ranking and slice selection module 140 at the subscriber level. For example, like with the CSP ranking and slice selection module 140, the CSP ranking module 122 may consider QoS, pricing, subscriber privileges, and agreements between the CSPs 102, the application provider 112, and the subscriber. However, in some embodiments, there are key differences in how the CSP ranking module 122 works.

In some embodiments, the CSP ranking module 122 may collect various types of information for use by the applications 160 when determining which CSP 102 to use. For example, the CSP ranking module may rank the CSPs based on QoS, pricing, subscriber privileges, and/or agreements between the CSPs 102, the application provider 112, and/or the subscriber. The QoS of similar services provided by the CSPs 102 for subscribers in similar situations is computed here or gathered from other subscribers. Additionally, the price of similar services provided by CSPs 102 for subscribers in similar situations is computed here or gathered from other subscribers. Information about the privileges supported by the CSPs 102 that can be utilized by the application is collected and made available for applications 160 to determine the CSP 102 to use. Information regarding the agreements between the different CSPs 102 to determine what rules should be enforced and how the CSP 102 will charge the application provider 112 is also collected. Examples of rules could include the application cannot provide certain services at certain times or while the subscriber is at a certain location.

The above data is used for the application provider 112 to come with a ranking and made available to the CSP ranking and slice selection module 140.

Media Content and Targeted Ads 120: Ads can be targeted at specific subscribers using traditional ad targeting mechanism. The difference here is that, in some embodiments, the greater the savings for the subscriber, the higher the premium charged to the advertiser and the greater the space consume by the ad on the UI. The media content and targeted ads module 120 may include an ad pool, which includes a plurality of ads that can be presented to users, along with a user profile and user location information. The user profile may include preferences and other details about the subscriber to determine what ad to provide. The user location information may include dynamic location of the user shared (optionally) for targeted ads.

Other systems 124: Providing ads is just one mechanism for the application provider 112 to monetize the experience. Data about the consumer from the device that the customer agrees to provide to the application provider 112 is another example of a system what can be made available. For example, the subscriber may opt into a system where they provide data (e.g., feedback, user data, etc.) to the application provider 112 in exchange for the application provider 112 covering the costs of the subscriber's data utilization.

While FIG. 1 illustrates a computing environment 100 with a single user device 132 and three CSPs 102, suitable computing environments for implementing embodiments of this disclosure may include any number of user devices and CSPs. Likewise, the computing environment 100 may include more than one application provider 112. The various models, modules, systems, and components illustrated in FIG. 1 may exist, if at all, across a plurality of application providers 112, user devices 132, and CSPs 102. For example, some embodiments may include two application provider systems. The two application provider systems may be communicatively coupled using any suitable communications connection (e.g., using a WAN, a LAN, a wired connection, an intranet, or the Internet). For examples, the application provider systems may be part of a content delivery network (CDN), and they may contain replicas of the same data (e.g., applications).

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
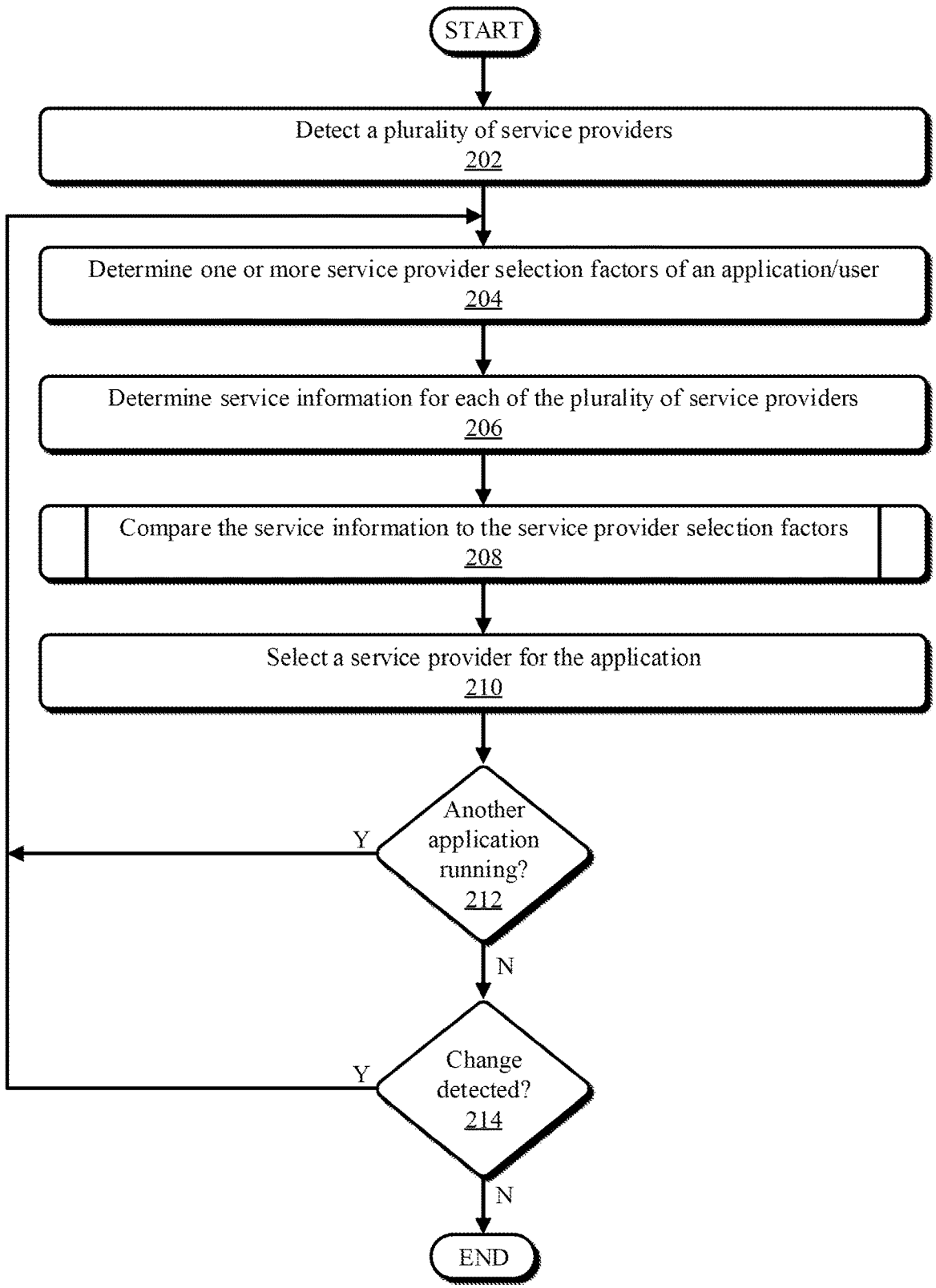
FIG. 2 illustrates a flowchart of an example method for selecting a service provider network for an application based on application-specific requirements, in accordance with embodiments of the present disclosure.

Referring now to FIG. 2, illustrated is a flowchart of an example method 200 for selecting a service provider for an application, in accordance with embodiments of the present disclosure. The method 200 may be performed by hardware, firmware, software executing on a processor, or any combination thereof. For example, the method 200 may be performed by a processor (e.g., in a user device 132) that is executing instructions of an application (e.g., application 160). In some embodiments, operations of the method 200 may be performed by multiple systems working collaboratively (e.g., some operations performed by a user device 132 and some operations performed by an application provider 112). The method 200 may begin at operation 202, where the processor detects a plurality of service providers.

In some embodiments, the processor is part of a mobile device (e.g., a cell phone or tablet). The user device may comprise one or more virtual SIM cards and a wireless network chipset (e.g., a 5G chipset). Using the virtual SIM card(s) and the wireless network chipset, the processor may identify a plurality of service providers to which the processor is able to connect to. For example, the processor may detect multiple mobile network providers that provide telecommunication and data services to subscribers in the same area as the mobile device.

At operation 204, the processor determines one or more service provider selection factors of an application that is in need of service and of the user of the mobile device. The service provider selection factors are factors that impact the selection of a service provider for a given application. For example, the service provider selection factors may include, without limitation, one or more of a quality of service (QoS) factor that indicates a minimum QoS acceptable to the application/user (e.g., maximum latency, minimum video resolution on a video app, etc.), network bandwidth of the service provider, a price of the service provider (e.g., per amount of data downloaded, overall, etc.), a regulatory compliance requirement of the application (e.g., application requires the service provider to meet GDPR requirements), a subscriber privilege of a user that is using the application (e.g., user group that the user belongs to, such as first responders or other high priority users), a type of service needed by the application (e.g., video streaming service, data service, voice and data service, etc.), a security level required by the application (e.g., a more secure network is needed when dealing with confidential data or patient data, etc.), location information (e.g., where the user is), and a functionality of the service provider (e.g., support for 5G slicing).

The service provider selection factors may be established by the application provider that develops and maintains the given application, by the subscriber, and/or by both. The user requirements (e.g., pricing) may be stored in a user profile that the user is able to update. In some embodiments, end users have complete access to set preferences on pricing and the quality of service for different categories of application usage, such as video streaming, social media, emails, messages, etc. A user can also opt-in/out of notifications from different application providers to get notified on situations like coverage issues, better pricing availability, and free service opportunities. Users can also opt in/out of sharing access to their data and usage characteristics with application providers and third parties. Users can also select their preferences on affinity to a particular service provider and can specify additional parameters to refine it, such as, for example, selecting a service provider based on location. The user will also get visibility to the user group they are part of and have the option to move to other groups that they see better suited.

Application providers can connect to a subscriber privileges module to get the latest preferences of the end user and update their user profile models. This then drives the CSP ranking and network selection. This also drives the integration with ad services as the application provider can leverage user approved access to collect data and run user profile analysis to drive target advertisement and provide ad-based free services as well.

In some embodiments, the application provider may have agreements with various service providers, and the service provider selection factors may be based on those agreements. For example, the application provider may have agreements that enable the end user (subscriber) to consume mobile resources (e.g., data) using the application without having to pay for the mobile resources or by paying a reduced rate for the resources. Instead, through the application provider's agreements with the service providers, the application provider may be responsible for the costs associated with the end user's data consumption. In return, the end user may agree to, for example, watch advertisements when using the application, provide the application provider (and/or service provider) with data, and/or both.

At operation 206, the processor determines service information for each of the plurality of service providers. The service information is any information that describes the capabilities, architecture, technologies used, functionality, pricing, etc. of the service providers. For example, service information may include, without limitation, maximum and average speeds of the networks, locations where the service provider has coverage, which generation hardware the service provider uses (e.g., 4G vs 5G mobile networks), which features the service provider supports (e.g., 5G slicing), security levels of the service providers (e.g., whether the service provider is approved for certain types of data, such as patient information), pricing of the service providers (e.g., based on agreements between the service provider and the application provider), etc.

In some embodiments, the service information that is collected at operation 206 corresponds to the service provider selection factors determined at operation 204. For example, if the application being run only cares about pricing and minimum speeds, the processor may only detect the pricing and speed information for the service providers. In some embodiments, the application may retrieve the service information itself, or it may receive the service information from the application provider. Regardless, the service information may be collected from the service providers themselves (e.g., directly or through analysis of the service provider website or other documentation) or through any other suitable means. For example, in some embodiments, the application provider collects the service information from other users of the application (e.g., through data collection built into the application). This historical data may be stored in a repository for use by other users attempting to execute the application.

Figure 3:
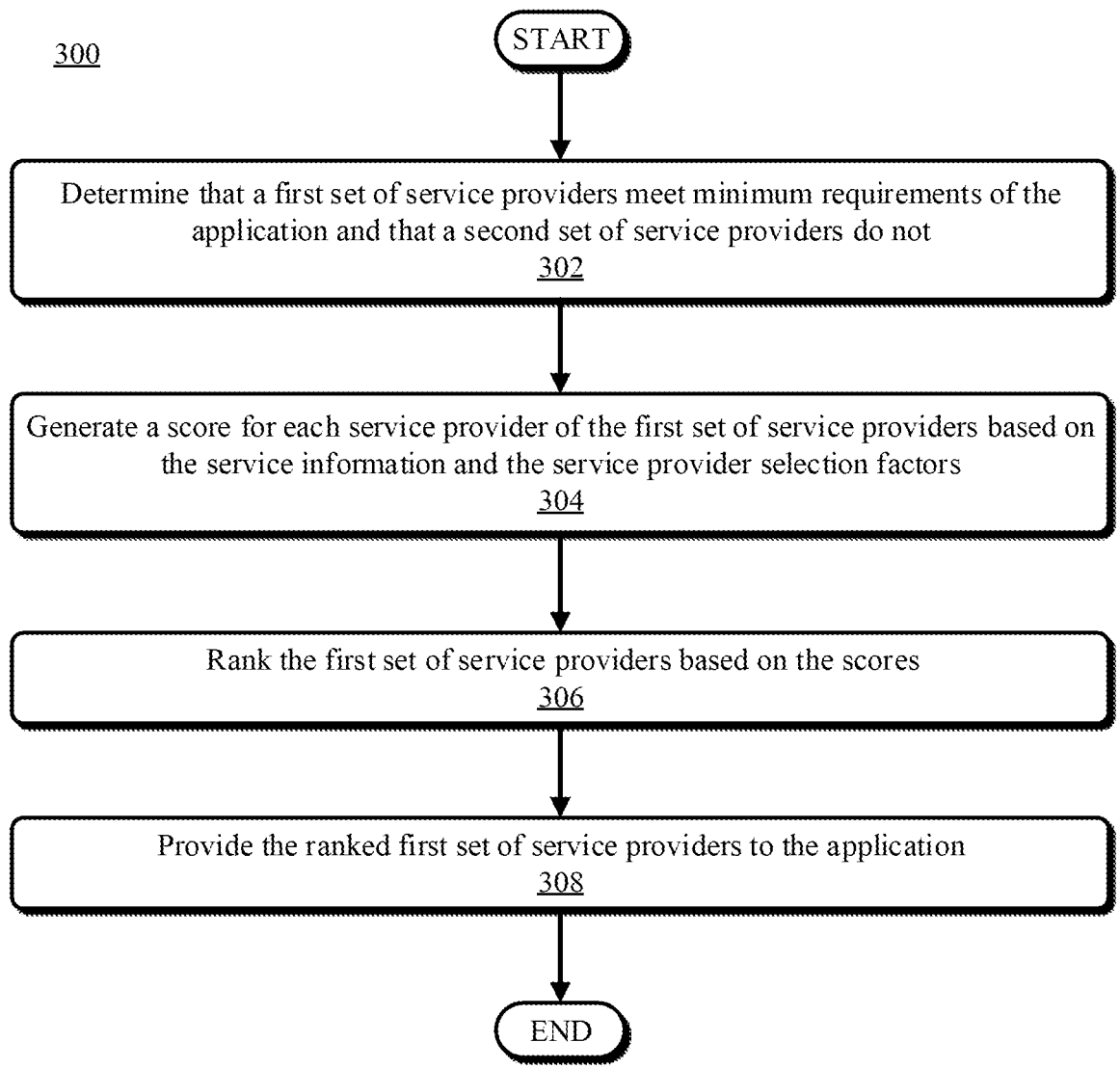
FIG. 3 illustrates a flowchart of an example method for comparing service provider information to application-specific requirements, in accordance with embodiments of the present disclosure.

At operation 208, the processor compares the service information to the service provider selection factors. The comparison is used to score, rank, or otherwise determine which service provider to use for the application. The method 300 discussed with respect to FIG. 3 illustrates an example embodiment of operation 208.

At operation 210, the processor selects a service provider for the application. The selected service provider may be the one that provides the best service to the application, provides the cheapest service to the application, or otherwise best satisfies the comparison at operation 208. In some embodiments, selecting the service provider includes connecting to the service provider to enable the service provider to provide service to the application. For example, the processor may utilize a virtual SIM card to establish a communication session with the service provider to allow the application to transmit and receive data over the service provider's network. The communication session may be in addition to other communication sessions established with the same and/or other service providers.

In some embodiments, selecting the service provider may include generating a slice with the service provider using 5G slicing capabilities. The slice may be with just the one service provider or it may spread across multiple service providers.

In some embodiments, selecting a service provider for the application may include selecting multiple service providers. For example, the processor may determine that a first service provider should be used to provide a first set of services to the application (e.g., streaming video services), while a second service provider should be used to provide a second set of services to the application (e.g., downloading a movie). Then, the processor may create concurrent communication sessions with both the first and second service provider. This may be done using one or more virtual SIM cards. For example, the processor may connect to the first service provider using a first virtual SIM card and concurrently connect to the second service provider using a second virtual SIM card.

In some embodiments, the processor automatically selects the one or more service providers for the application. In other embodiments, the processor may select the one or more service providers in response to user input. For example, the processor may provide a list of service providers to the user and allow the user to select the service provider for the application. The list may include, for example, a ranking of the service provider, a score of the service provider (as a whole and/or individually for each service provider selection factor), and/or an indication of which service provider selection factors the service provider satisfies (e.g., an indication of why the service provider has the rank or score that it has).

At decision block 212, the processor determines whether there is another application running on the mobile device for which a service provider needs to be selected. As discussed herein, the selection of service providers may be done at the application-level such that each application is independently able to connect to its preferred service provider based on its own service provider factors and user preference. This enables each application to receive the best service for its given needs. Accordingly, if the processor determines that another application is running and needs a service provider selected (Yes at decision block 212), the method 200 returns to operation 204 and operations 204-210 are performed for the other application.

In some embodiments, operations 202 and 206 may be skipped for the other application since they have already been performed and the application may already have access to the needed data. In other embodiments, these operations (or only operation 206) may need to be performed for the other application. For example, if the other application needs some service information that was not previously collected (e.g., because the first application did not care about that data), then operation 206 may be performed in whole or in part to collect the needed, but uncollected, service information.

If the processor determines that there are no other applications that need a service provider to be selected (No at decision block 212), the processor can monitor the application, user device, and/or service provider for changes at decision block 214. For example, the processor can detect changes in the service provider (e.g., speed), the application (e.g., the type of data being used, such as whether the security level of it has changed), the user preferences (e.g., updates to a user profile that indicate a change in preferred pricing), and/or the user device itself (e.g., its location). In particular, the processor monitors for any changes that may impact the selection of the service provider for a running application. For example, if one of the running applications has a minimum speed requirement, the processor may monitor the speeds being provided to that application by its service provider for dips in speed that drop below the minimum speed requirement.

In some embodiments, the processor monitors for all changes that affected the selection, not just those that were mandatory (e.g., minimum speed). In other words, any factor that was considered when selecting the service provider is constantly (or periodically) monitored for changes. In response to detecting a change (Yes at decision block 214), the method 200 may return to operation 204 (or operation 208), and the service providers can be re-evaluated and, if necessary, a new service provider can be selected. In some embodiments, the service providers may be periodically re-evaluated, or they may be re-evaluated when the detected change is large (e.g., greater than a threshold).

If no changes are detected (No at decision block 214), the method 200 ends.

Referring now to FIG. 3, illustrated is a flowchart of an example method 300 for comparing service provider information to application-specific requirements, in accordance with embodiments of the present disclosure. The method 300 may be performed by hardware, firmware, software executing on a processor, or any combination thereof. For example, the method 300 may be performed by a processor (e.g., in a user device 132) that is executing instructions of an application (e.g., application 160). In some embodiments, operations of the method 300 may be performed by multiple systems working collaboratively (e.g., some operations performed by a user device 132 and some operations performed by an application provider 112). The method 300 may begin at operation 302, where the processor determines that a first set of service providers meet minimum requirements of the application and that a second set of service providers do not meet the minimum requirements of the application.

In some embodiments, the application and/or user may indicate that some service provider selection factors are mandatory. For example, a medical application that is used to access patient records may always require that the service provider's security level meet HIPPA or other government regulations regarding data privacy. Accordingly, the processor may group the available service providers into those that meet all of the mandatory factors and those that do not. This may be particularly advantageous in embodiments where users are able to manually override selection decisions for the application by preventing a user from selecting a non-compliant service provider.

At operation 304, the processor generates a score for each service provider. In some embodiments, such as those where the processor has pre-filtered or grouped service providers according to whether they meet the mandatory factors/ requirements, the processor may only generate scores for those service providers that are in the first set of service providers. The scores may be based on a comparison of the service information and the service provider selection factors. For example, in some embodiments, the service information that corresponds to the service provider selection factors may be statistically combined into a single score for each service provider. The score may be generated using any suitable statistical or mathematical scoring system. For example, in some embodiments, each individual service provider selection factor can be individually scored.

For example, some factors may be scored as a binary 1 or 0 based on whether the service provider satisfies that factor, while other factors may have a range of scores (e.g., between 0 and 1, 0 and 100, or any other scale), and still other factors may receive a score that is identical to the service information (e.g., a service provider with an average download speed of 135 MB/second may get a score of 135 for that factor). The individual scored can then be combined using any suitable statistical method, such as a weighted combination where the weight of a given factor indicates its relative importance to the user and/or application.

After generating an overall score for the service providers, the processor may rank the service providers based on their scores at operation 306. In some embodiments, only the first set of service providers is ranked, while in other embodiments, all of the service providers are ranked.

At operation 308, the ranked list of service providers is provided to the application. In some embodiments, the application may already have access to the rank since the application itself (through its execution on the processor) may generate the rank. In other embodiments, the rank may be generated by the application provider and then transmitted to the application on the end user device. In these embodiments, the application provider may transmit the ranks over the user's default service provider network.

After the ranked list of service providers is provided to the application, the method 300 may end.

Figure 4:
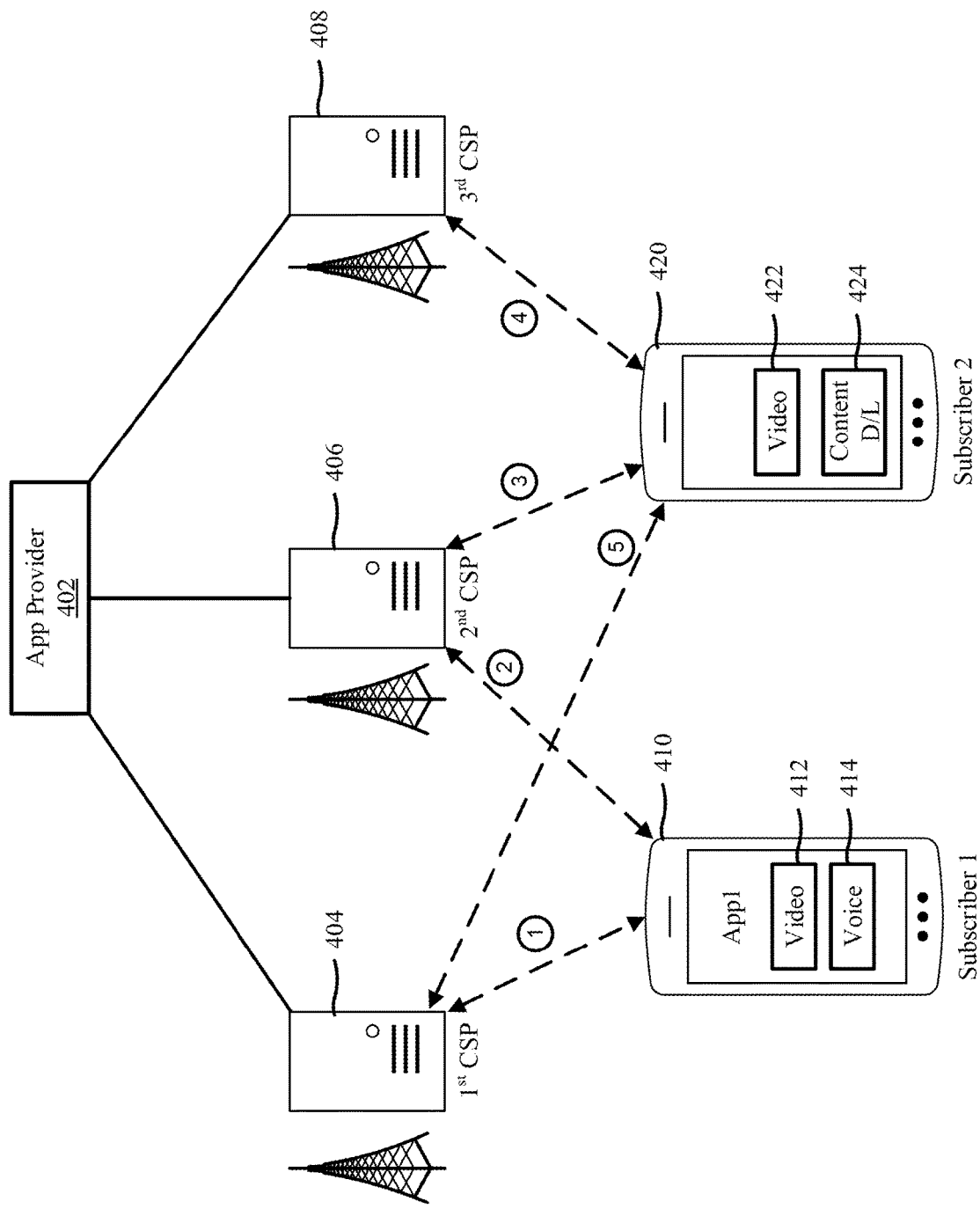
FIG. 4 illustrates a flow diagram of an example computing environment 400 in which an illustrative example of application-driven network selection is shown, in accordance with embodiments of the present disclosure.

Referring now to FIG. 4, shown is a flow diagram of an example computing environment 400 in which an illustrative use case is shown, in accordance with embodiments of the present disclosure. In the example use case, an application provider 402 has agreements in place with three service providers (CSPs): first service provider 404, second service provider 406, and third service provider 408. The application provider 402 maintains an application (App1), which is installed on a first end user device 410 of a first subscriber (Subscriber 1) and a second end user device 420 of a second subscriber (Subscriber 2).

The first subscriber uses the application to consume video 412 and voice 414 data using the first user device 410. The CSP ranking module on the application determines that the first service provider 404 is the best service provider for this content, and at step 1 (denoted by the number 1 in a circle), the application establishes a connection to the first service provider 404 using a virtual SIM card of the first user device 410.

At step 2, the first subscriber continues using the application for several hours and the CSP ranker at the application provider 402 is able to predict that network congestion will happen at an upcoming time. The application provider 402 may make this determination based on historical data (e.g., the first service provider 404 is always busy at certain hours of certain days and in certain location) or by monitoring data from other subscribers. The application provider 402 conveys the information to the CSP ranker on the user device 410. The CSP ranker analyzes the information and determines that the second service provider 406 should be selected. Accordingly, the second service provider 406 is selected prior to the network congestion resulting in the application providing low quality service to the first subscriber. Because the second service provider 406 is more expensive, ads of greater frequency are provided to the first subscriber. The system switches back to the first service provider 404 when the congestion decreases.

Meanwhile, the second subscriber watches a video 422 using the application on the second user device 420. At step 3, the second service provider 406 is selected for the second subscriber. The second subscriber then decides to download 424 the video while simultaneously watching it. The CSP ranker on the second user device 420 determines that the third service provider 408 is the best network for the download. The application therefore simultaneously connects to multiple service provider at the same time by establishing, at step 4, a communication session or link between the second user device 420 and the third service provider 408. This may be done using a virtual SIM card on the second user device 420, and the connection can be maintained until the download is complete.

The second subscriber may start getting poor performance on the video being streamed using the second service provider 406. The CSP ranker may determine that creating a slice for the streaming video is the best option, as opposed to switching to another service provider. Accordingly, a slice may be created on the second service provider 406 network for the second subscriber.

An emergency event happens. As a result of the emergency event, first responders may be prioritized on the second service provider's 406 network due to an agreement between the second service provider 406 and the government. Because the second subscriber is not a first responder, the second subscriber may receive worse service from the second service provider or be removed from the network entirely. Accordingly, the CSP ranker determines, at step 5, to switch the streaming video 422 service from the second service provider 406 to the first service provider 404, which will be able to provide better service to the second subscriber.

Consider now a second example use case of embodiments of the present disclosure. A subscriber, named Susan, has a limited data plan and wants to stream video. She therefore chooses the Free Video application to do this as she knows that using the application will not impact here data plan. In return she knows that she will have to view some ads and Free Video will keep track of her viewing habits. Susan moves to a location where the network is congested so it cost more to provide the free service. This results in more ads being pushed to Susan.

The Free Video application's preferred CSP is CSP1. Accordingly, the Free Video application will change the SIM configuration to use CSP1 while Susan is viewing the video and confirms that Susan is getting a good experience. Susan moves to a different location where CSP1 does not provide the best service. The Free Video application detects this and transfers to CSP2 and increases the number of ads and shares more data with CSP2 given the higher costs for Free Video.

Free Video's application permits users to both stream the content and also download portions of the content. Susan decides to download the content while streaming it. The application determines that CSP1 has the best video network, but CSP3 has the best network for downloading content due to its relationship with a CDN, so the application requests the SIM to concurrently open two network connections. The first network connection is open with CSP1 and is used to provide the streaming video to Susan. Concurrently, a second network connection is open with CSP3 and is used to download video data to Susan's mobile device. By splitting the streaming video and video downloads into different streams of data serviced by different CSPs, the application is able to provide Susan the best experience.

During use, the application monitors the network performance and user experience. The application detects that Susan is not getting good performance, so it interacts with the CSPs, and it is determined that a slice should be created. The application therefore initiates the creation of a slice across both CSPs, thus enhancing the overall customer experience.

At some point in time, an important event occurs which requires first responders to have primary access to CSP1. Given agreements with CSP1, the application switches out of CSP1 to another provider as Susan does not belong to the first responder group.

Consider now a third example use case of embodiments of the present disclosure. Susan is a doctor at a hospital in the EU and uses her 5G phone in the morning at home to view her calendar and data pertaining to patients she will meet that day. She wishes to share medical records of one of her patients with Aaron, another expert on the same disease, but the application prevents her from sharing this data from home as she is over a less secure public 5G network. Susan drives to the hospital and once she reaches it, her phone automatically connects to the private 5G network at the hospital. The application automatically recognizes the availability of the more secure network and informs Susan that her privileges on the application have been enhanced. Susan is then able to share the medical records with Aaron over the private 5G network.

Susan makes a video call to her daughter using another application. The video call application determines that the data being transmitted is not highly sensitive, unlike the patient data, and continues to connect over the public 5G network while the medical records are being transferred over the private 5G network. This ensures that the limited bandwidth on the private 5G network is not consumed for non-work-related activities.

In this same example, if Susan and her patients were in the EU and Aaron, who is advising, was present in a different geographical location, such as the USA, then the application might not allow the Aaron to connect to an ISP in the USA which is not compliant with GDPR regulations. In order to receive the patient data, Aaron may be required to connect to and share data via an ISP which is strongly compliant with the required regulations.

Figure 5:
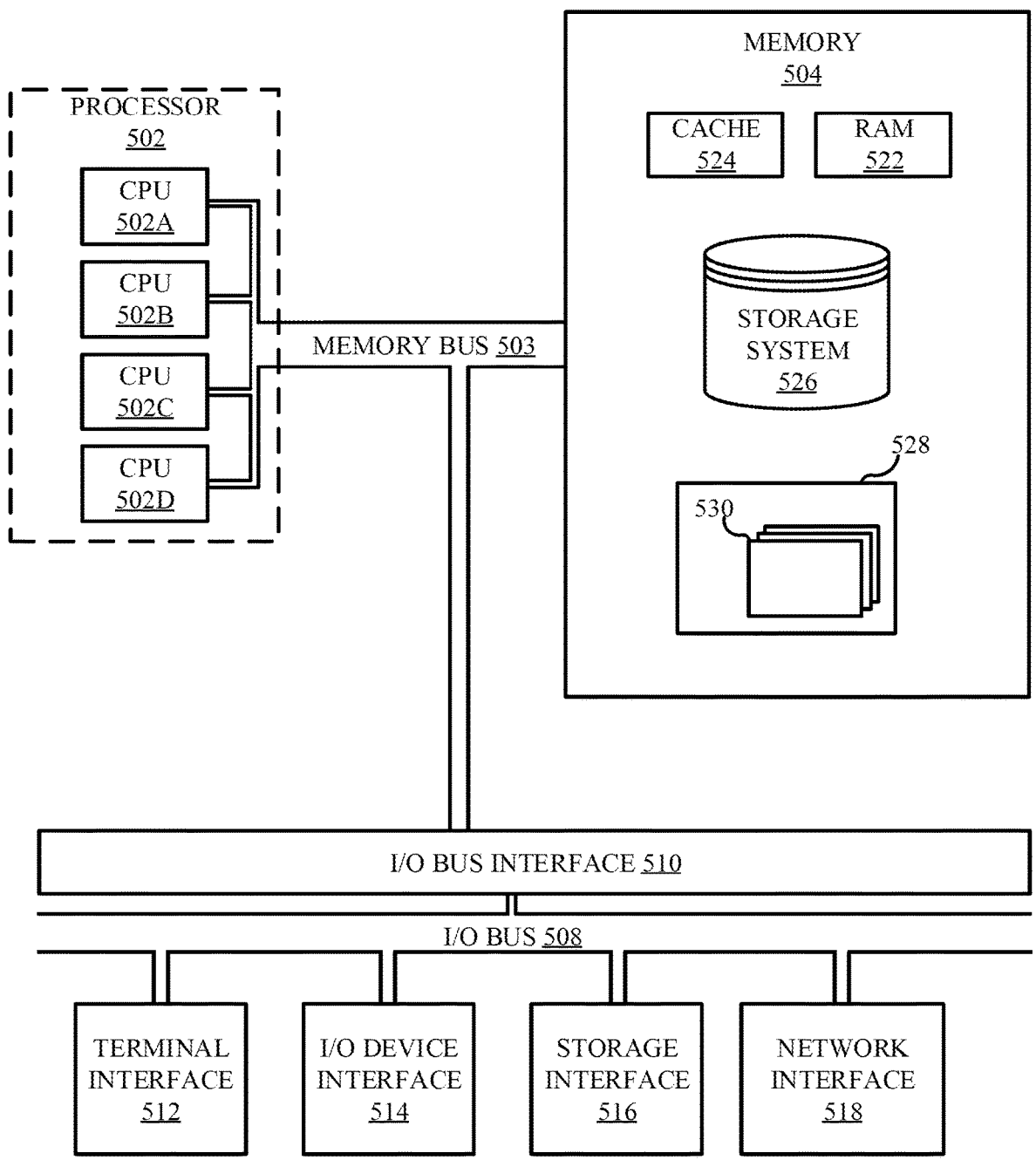
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary. Furthermore, the modules are listed and described illustratively according to an embodiment and are not meant to indicate necessity of a particular module or exclusivity of other potential modules (or functions/purposes as applied to a specific module).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
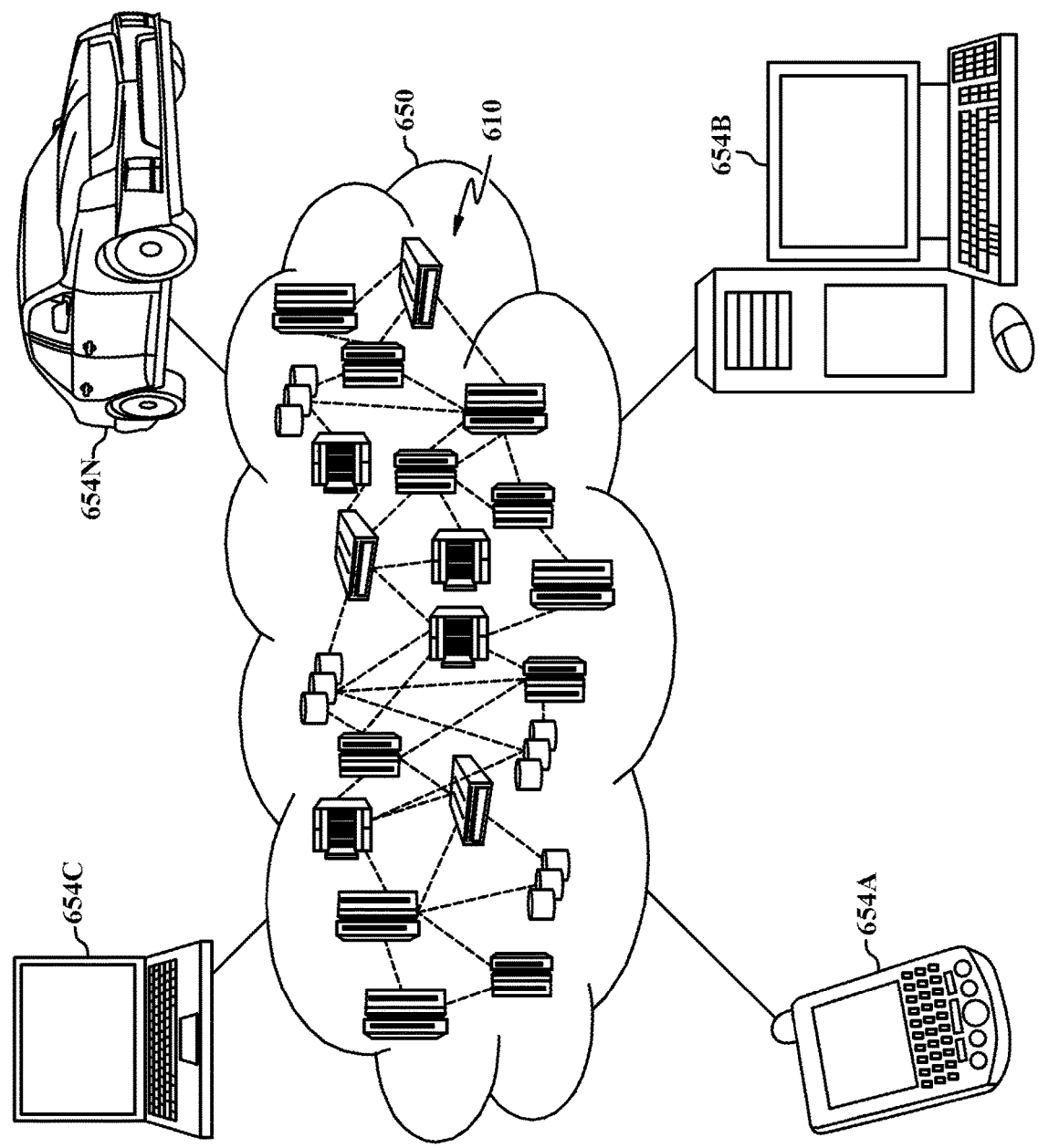
FIG. 6 depicts a cloud computing environment, in accordance with embodiments of the present disclosure.

Referring now to FIG. 6, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
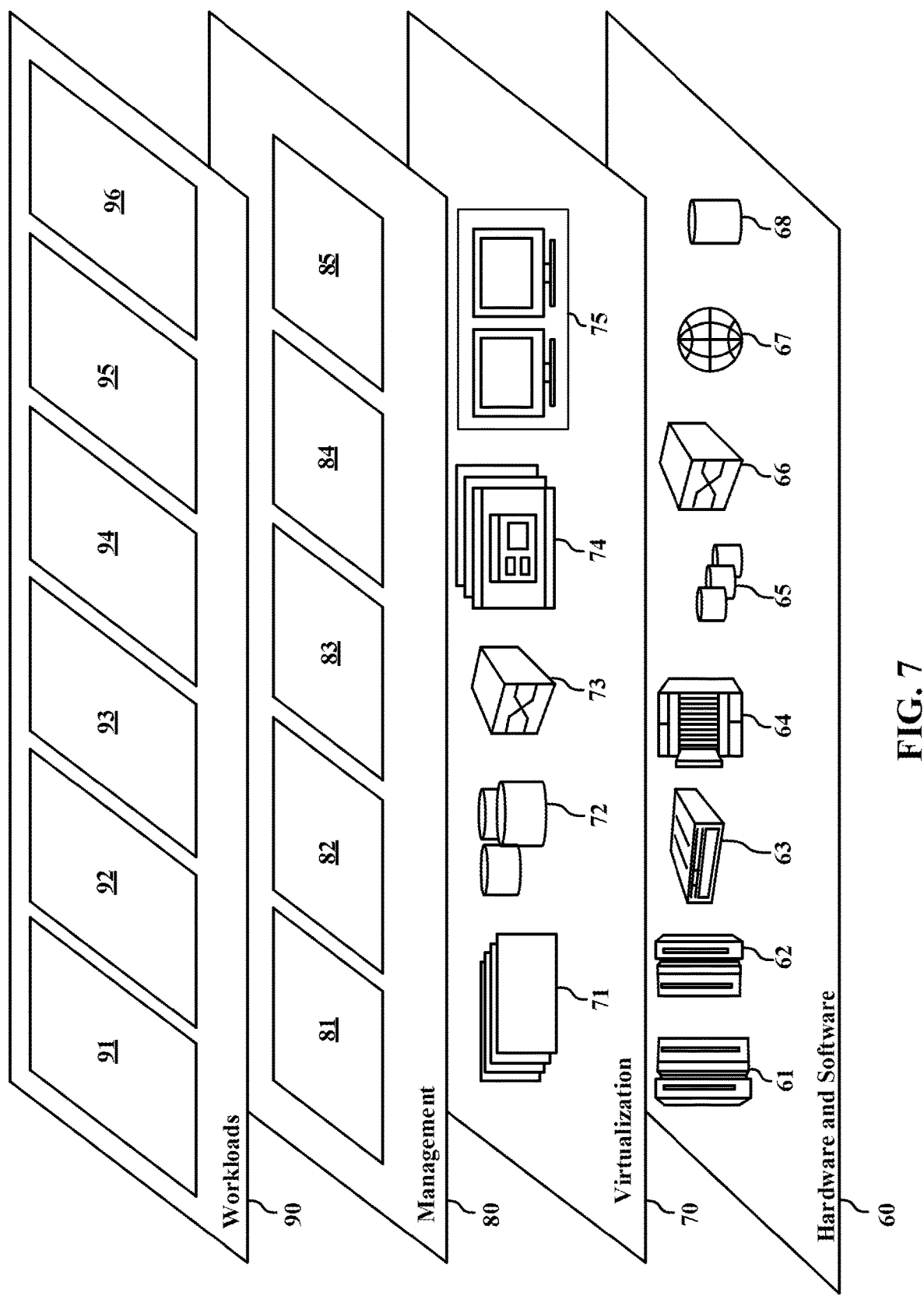
FIG. 7 depicts abstraction model layers, in accordance with embodiments of the present disclosure.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service provider ranking and selection 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications, alterations, and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s). Additionally, it is intended that the following claim(s) be interpreted as covering all such alterations and modifications as fall within the true spirit and scope of the invention.

Example Embodiments:

A non-limiting list of Example Embodiments are provided hereinafter to demonstrate some aspects of the present disclosure.

Example Embodiment 1 is a method. The method includes detecting a plurality of available service providers for an application running on a computing device. The method further includes comparing service information for each of the plurality of service providers to a set of service provider selection factors for the application. The method further includes selecting a first service provider of the plurality of service providers to provide service for the application.

Example Embodiment 2 includes the method of Example Embodiment 1, including or excluding optional features. In this Example Embodiment, the method includes detecting a change in the service information for at least one service provider of the plurality of service providers. The method further includes comparing new service information for the at least one service provider to the set of service provider selection factors for the application. The method further includes switching to a second service provider of the plurality of service providers.

Example Embodiment 3 includes the method of any one of Example Embodiments 1 to 2, including or excluding optional features. In this Example Embodiment, the method includes detecting a change in a type of activity being performed by the application. The method further includes determining, using the set of service provider selection factors for the application, that a second service provider of the plurality of service providers should be used to provide service to the application. The method further includes switching to the second service provider.

Example Embodiment 4 includes the method of any one of Example Embodiments 1 to 3, including or excluding optional features. In this Example Embodiment, the method includes switching to a second service provider for the application, wherein the switching is performed using one or more application programming interface (API) based virtual SIM cards.

Example Embodiment 5 includes the method of any one of Example Embodiments 1 to 4, including or excluding optional features. In this Example Embodiment, the computing device further includes a second application running thereon. The second application receives service from a second service provider that is different than the first service provider. Optionally, the computing device is concurrently connected to both the first and second service providers, and the first and second service providers provide service to the first and second applications, respectively, at the same time.

Example Embodiment 6 includes the method of any one of Example Embodiments 1 to 5, including or excluding optional features. In this Example Embodiment, selecting the first service provider comprises scoring each of the plurality of service providers based on the set of service provider selection factors, ranking each of the plurality of service providers based on the scoring, and determining that the first service provider is the highest ranked service provider. Optionally, the ranking further includes comparing the service information for each of the plurality of service providers to a user profile for a user of the application. Optionally, the set of service provider selection factors include at least one factor selected from the group consisting of a quality of service (QoS) factor, network bandwidth of the service provider, a price of the service provider, a regulatory compliance requirement of the application, a subscriber privilege of a user that is using the application, a type of service needed by the application, and a functionality of the service provider.

Example Embodiment 7 includes the method of any one of Example Embodiments 1 to 6, including or excluding optional features. In this Example Embodiment, the method includes, in response to determining that the first service provider is providing inadequate service to the application, creating a new slice for the application. The method further includes connecting the application to the first service provider using the new slice. Optionally, the new slice is created across two or more service providers. The two or more service providers include the first service provider.

Example Embodiment 8 is a method. The method includes executing a plurality of applications on a mobile device. The mobile device has one or more virtual SIM cards. The method further includes determining that a first application of the plurality of applications should receive service from a first service provider. The method further includes determining that a second application of the plurality of applications should receive service from a second service provider. The method further includes connecting, using the one or more virtual SIM cards, the mobile device to the first and second service providers such that the first service provider provides mobile data service to the first application and the second service provider provides mobile data service to the second application concurrently.

Example Embodiment 9 includes the method of Example Embodiment 8, including or excluding optional features. In this Example Embodiment, determining that the first application should receive service from the first service provider comprises comparing service information for each of a plurality of service providers to a set of factors for the first application, scoring each of the plurality of service providers based on the set of factors, ranking each of the plurality of service providers based on the scoring, and determining that the first service provider is the highest ranked service provider for the first application. Optionally, determining that the second application should receive service from the second service provider comprises comparing service information for each of a plurality of service providers to a second set of factors for the second application, scoring each of the plurality of service providers based on the second set of factors, ranking each of the plurality of service providers based on the scoring, and determining that the second service provider is the highest ranked service provider for the second application.

Example Embodiment 10 is a system. The system includes a memory and a processor communicatively coupled to the memory. The processor is configured to perform a method. The method comprises detecting a plurality of available service providers for an application running on the system. The method further includes comparing service information for each of the plurality of service providers to a set of service provider selection factors for the application. The method further includes selecting a first service provider of the plurality of service providers to provide service for the application.

Example Embodiment 11 includes the system of Example Embodiment 10, including or excluding optional features. In this Example Embodiment, the method further comprises detecting a change in the service information for at least one service provider of the plurality of service providers, comparing new service information for the at least one service provider to the set of service provider selection factors for the application, and switching to a second service provider of the plurality of service providers.

Example Embodiment 12 includes the system of any one of Example Embodiments 10 to 11, including or excluding optional features. In this Example Embodiment, the method further comprises switching to a second service provider for the application. The switching is performed using one or more application programming interface (API) based virtual SIM cards.

Example Embodiment 13 includes the system of any one of Example Embodiments 10 to 12, including or excluding optional features. In this Example Embodiment, the system further includes a second application running thereon. The second application receives service from a second service provider that is different than the first service provider.

Example Embodiment 14 is a system. The system includes a memory; and a processor communicatively coupled to the memory. The processor is configured to perform a method. The method comprises: executing a plurality of applications on a mobile device. The mobile device has one or more virtual SIM cards. The method further includes determining that a first application of the plurality of applications should receive service from a first service provider. The method further includes determining that a second application of the plurality of applications should receive service from a second service provider. The method further includes connecting, using the one or more virtual SIM cards, the mobile device to the first and second service providers such that the first service provider provides mobile data service to the first application and the second service provider provides mobile data service to the second application concurrently.

Example Embodiment 15 includes the system of Example Embodiment 14, including or excluding optional features. In this Example Embodiment, determining that the first application should receive service from the first service provider comprises comparing service information for each of a plurality of service providers to a set of factors for the first application, scoring each of the plurality of service providers based on the set of factors, ranking each of the plurality of service providers based on the scoring, and determining that the first service provider is the highest ranked service provider for the first application. Optionally, determining that the second application should receive service from the second service provider comprises comparing service information for each of a plurality of service providers to a second set of factors for the second application, scoring each of the plurality of service providers based on the second set of factors, ranking each of the plurality of service providers based on the scoring, and determining that the second service provider is the highest ranked service provider for the second application.

Example Embodiment 16 is a computer program product comprising a computer readable storage medium having program instructions embodied therewith. The computer-readable medium includes instructions that direct the processor to perform a method. The method comprises detecting a plurality of available service providers for an application running on a computing device. The method further includes comparing service information for each of the plurality of service providers to a set of service provider selection factors for the application. The method further includes selecting a first service provider of the plurality of service providers to provide service for the application.

Example Embodiment 17 includes the computer-readable medium of Example Embodiment 16, including or excluding optional features. In this Example Embodiment, the computing device further includes a second application running thereon. The second application receives service from a second service provider that is different than the first service provider. The computing device is concurrently connected to both the first and second service providers. The first and second service providers provide service to the first and second applications, respectively, at the same time.

Example Embodiment 18 includes the computer-readable medium of any one of Example Embodiments 16 to 17, including or excluding optional features. In this Example Embodiment, selecting the first service provider comprises scoring each of the plurality of service providers based on the set of service provider selection factors, ranking each of the plurality of service providers based on the scoring, and determining that the first service provider is the highest ranked service provider.

Example Embodiment 19 includes the computer-readable medium of any one of Example Embodiments 16 to 18, including or excluding optional features. In this Example Embodiment, the method further comprises, in response to determining that the first service provider is providing inadequate service to the application, creating a new slice for the application, and connecting the application to the first service provider using the new slice.

What is claimed is:

1. A method comprising:
    detecting a plurality of available service providers for an application running on a computing device;
    comparing service information for each of the plurality of service providers to a set of service provider selection factors for the application;
    selecting, based on the comparing, a first service provider of the plurality of service providers to provide service for the application;
    in response to determining that the first service provider is providing inadequate service to the application, creating a new slice for the application, wherein the new slice is created across two or more service providers; and
    connecting the application to the two or more service providers using the new slice.

2. The method of claim 1, further comprising:
    detecting a change in the service information for at least one service provider of the plurality of service providers;
    comparing new service information for the at least one service provider to the set of service provider selection factors for the application; and
    switching to a second service provider of the plurality of service providers.

3. The method of claim 1, further comprising:
    detecting a change in a type of activity being performed by the application;
    determining, using the set of service provider selection factors for the application, that a second service provider of the plurality of service providers should be used to provide service to the application; and
    switching to the second service provider.

4. The method of claim 1, further comprising:
    switching to a second service provider for the application, wherein the switching is performed using one or more application programming interface (API) based virtual SIM cards.

5. The method of claim 1, wherein the computing device further includes a second application running thereon, and wherein the second application receives service from a second service provider that is different than the first service provider.

6. The method of claim 5, wherein:
    the computing device is concurrently connected to both the first and second service providers; and
    the first and second service providers provide service to the first and second applications, respectively, at the same time.

7. The method of claim 1, wherein selecting the first service provider comprises:
    scoring each of the plurality of service providers based on the set of service provider selection factors;
    ranking each of the plurality of service providers based on the scoring; and
    determining that the first service provider is the highest ranked service provider.

8. The method of claim 7, wherein the ranking further includes comparing the service information for each of the plurality of service providers to a user profile for a user of the application.

9. The method of claim 7, wherein the set of service provider selection factors include at least one factor selected from the group consisting of:
- a quality of service (QoS) factor;
- network bandwidth of the service provider;
- a price of the service provider;
- a regulatory compliance requirement of the application;
- a subscriber privilege of a user that is using the application;
- a type of service needed by the application; and
- a functionality of the service provider.

10. A method comprising:
- executing a plurality of applications on a mobile device, the mobile device having one or more virtual SIM cards;
- determining that a first application of the plurality of applications should receive service from a first service provider;
- determining that a second application of the plurality of applications should receive service from a second service provider;
- connecting, using the one or more virtual SIM cards, the mobile device to the first and second service providers such that the first service provider provides mobile data service to the first application and the second service provider provides mobile data service to the second application concurrently.

11. The method of claim 10, wherein determining that the first application should receive service from the first service provider comprises:
- comparing service information for each of a plurality of service providers to a set of factors for the first application;
- scoring each of the plurality of service providers based on the set of factors;
- ranking each of the plurality of service providers based on the scoring; and
- determining that the first service provider is the highest ranked service provider for the first application.

12. The method of claim 11, wherein determining that the second application should receive service from the second service provider comprises:
- comparing service information for each of a plurality of service providers to a second set of factors for the second application;
- scoring each of the plurality of service providers based on the second set of factors;
- ranking each of the plurality of service providers based on the scoring; and
- determining that the second service provider is the highest ranked service provider for the second application.

13. A system comprising:
- a memory; and
- a processor communicatively coupled to the memory, wherein the processor is configured to perform a method comprising:
  - detecting a plurality of available service providers for an application running on the system;
  - comparing service information for each of the plurality of service providers to a set of service provider selection factors for the application;
  - selecting a first service provider of the plurality of service providers to provide service for the application;
  - in response to determining that the first service provider is providing inadequate service to the application, creating a new slice for the application, wherein the new slice is created across two or more service providers; and
  - connecting the application to the two or more service providers using the new slice.

14. The system of claim 13, wherein the method further comprises:
- detecting a change in the service information for at least one service provider of the plurality of service providers;
- comparing new service information for the at least one service provider to the set of service provider selection factors for the application; and
- switching to a second service provider of the plurality of service providers.

15. The system of claim 13, wherein the method further comprises:
- switching to a second service provider for the application, wherein the switching is performed using one or more application programming interface (API) based virtual SIM cards.

16. The system of claim 13, wherein the system further includes a second application running thereon, and wherein the second application receives service from a second service provider that is different than the first service provider.

17. A system comprising:
- a memory; and
- a processor communicatively coupled to the memory, wherein the processor is configured to perform a method comprising:
  - executing a plurality of applications on a mobile device, the mobile device having one or more virtual SIM cards;
  - determining that a first application of the plurality of applications should receive service from a first service provider;
  - determining that a second application of the plurality of applications should receive service from a second service provider;
  - connecting, using the one or more virtual SIM cards, the mobile device to the first and second service providers such that the first service provider provides mobile data service to the first application and the second service provider provides mobile data service to the second application concurrently.

18. The method of claim 17, wherein determining that the first application should receive service from the first service provider comprises:
- comparing service information for each of a plurality of service providers to a set of factors for the first application;
- scoring each of the plurality of service providers based on the set of factors;
- ranking each of the plurality of service providers based on the scoring; and
- determining that the first service provider is the highest ranked service provider for the first application.

19. The method of claim 18, wherein determining that the second application should receive service from the second service provider comprises:
- comparing service information for each of a plurality of service providers to a second set of factors for the second application;
- scoring each of the plurality of service providers based on the second set of factors;
- ranking each of the plurality of service providers based on the scoring; and determining that the second service provider is the highest ranked service provider for the second application.

20. A computer program product comprising a computer readable storage medium having program instructions embodied therewith, the program instructions executable by a processor to perform a method comprising:
 detecting a plurality of available service providers for an application running on a computing device;
 comparing service information for each of the plurality of service providers to a set of service provider selection factors for the application; and
 selecting a first service provider of the plurality of service providers to provide service for the application, wherein:
 the computing device further includes a second application running thereon;
 the second application receives service from a second service provider that is different than the first service provider;
 the computing device is concurrently connected to both the first and second service providers; and
 the first and second service providers provide service to the first and second applications, respectively, at the same time.

21. The computer program product of claim 20, wherein selecting the first service provider comprises:
 scoring each of the plurality of service providers based on the set of service provider selection factors;
 ranking each of the plurality of service providers based on the scoring; and
 determining that the first service provider is the highest ranked service provider.

22. The computer program product of claim 20, wherein the method further comprises:
 in response to determining that the first service provider is providing inadequate service to the application, creating a new slice for the application; and
 connecting the application to the first service provider using the new slice.

* * * * *